A. PARRY.
HANDLE ATTACHMENT.
APPLICATION FILED OCT. 23, 1919.
1,329,203. Patented Jan. 27, 1920.
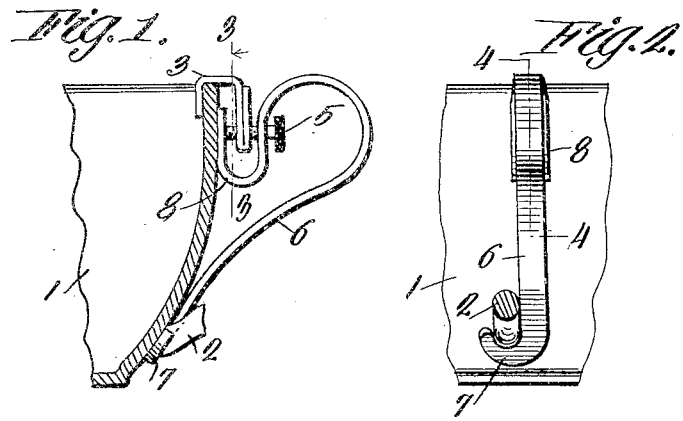
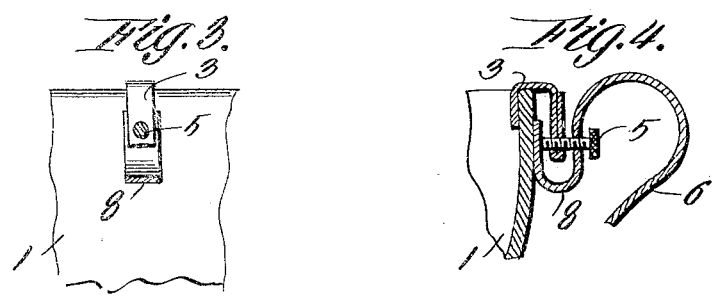
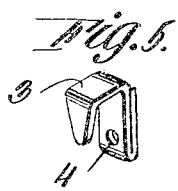
WITNESSES
ARTHUR PARRY, Inventor
By Richard B. Owen
Attorney

UNITED STATES PATENT OFFICE.

ARTHUR PARRY, OF PORT ORCHARD, WASHINGTON.

HANDLE ATTACHMENT.

1,329,203.   Specification of Letters Patent.   Patented Jan. 27, 1920.

Application filed October 23, 1919. Serial No. 332,628.

*To all whom it may concern:*

Be it known that I, ARTHUR PARRY, a subject of Great Britain, residing at Port Orchard, in the county of Kitsap and State of Washington, have invented certain new and useful Improvements in Handle Attachments, of which the following is a specification.

Cups frequently lose their handles and like receptacles without handles would be rendered more convenient for service if provided with handles. This invention therefore has for its primary object the provision of a handle which may be readily attached to or removed from a cup or like article and which may be cheaply constructed and applied by the average person without the use of tools.

The drawings illustrate a preferred embodiment of the invention. However, it is to be understood that in adapting the same to meet different conditions, various changes in the form, proportion and minor details of construction may be resorted to without departing from the nature of the invention as claimed hereinafter.

Referring to the drawings hereto attached:—

Figure 1 is a side view of a handle attachment showing the same applied to a cup, a portion of the latter being illustrated.

Fig. 2 is a front view of the part illustrated in Fig. 1.

Fig. 3 is a sectional detail on the line 3—3 of Fig. 1 looking to the left as indicated by the arrows.

Fig. 4 is a sectional detail on the line 4—4 of Fig. 2.

Fig. 5 is a detail perspective view of the clip which is adapted to be applied to the upper portion of the cup or other receptacle to be provided with the handle.

Corresponding and like parts are referred to in the following description and indicated in the several views of the drawings by like reference characters.

The numeral 1 designates a cup or other receptacle adapted to be supplied with a handle in accordance with the present invention. The cup shown in Figs. 1 and 2 has its handle broken away, a portion of the handle being shown at 2. To supply the cup or other receptacle with a handle in accordance with the present invention, a clip 3 is provided and is fitted to the upper edge portion of the cup or other receptacle. The clip 3 is of U-form and is adapted to be placed upon the upper edge of the cup so that one element engages the inner side of the cup and the other element is disposed upon the outside of the cup. The members of the clip are of unequal length, the inner member being the shorter. The outer member is reinforced by folding a portion thereof upon itself. The clip is preferably constructed of a strip of sheet metal which is bent upon itself into substantially U-form. The outer reinforced member of the clip is provided with a threaded opening 4 to receive a screw 5 said screw being provided with a head to admit of its ready manipulation by hand.

The handle 6 may be of any form and usually is constructed of a strip of sheet metal which is bent into the required shape. The upper end of the handle is secured to the cup or other receptacle by means of the clip 3 and screw 5. The lower portion of the handle is adapted to engage a side of the cup or other article to be provided with the attachment. As shown most clearly in Figs. 1 and 2 the lower end of the handle is formed with a hook 7 which is designed to engage about the lower or sub-portion of the broken handle 2 thereby preventing relative movement of the lower end of the handle on the side of the cup. When lifting the cup by the handle the tendency is to press the lower end of the handle against the side of the cup. This is due to the fact that a finger of the hand passes through the handle while another finger engages the lower portion of the handle on the outer side. The cup being supported in this manner is not liable to leave the lower portion of the handle, hence no occasion exists for positively connecting the lower portion of the handle with the cup. The upper end of the handle 6 is bent to form a loop 8 of substantially U-form which receives the outer member of the clip 3. The outer element of the loop 8 is apertured to receive the screw 5, the inner end of the screw engaging the member of the loop 8 in contact with the cup or receptacle.

As shown most clearly in Figs. 1 and 4 the inner member of the clip 3 and the member of the loop 8 engaging the cup have their end portions adapted to overlap. This is not essential but is preferred as it enables the side of the cup to be firmly and securely gripped between the members of the clip 3 and loop 8 receiving the side of the cup therebetween. By having the inner end of the screw 5 engaging the member of the loop 8 in contact with the cup and by having said screw passing loosely through the other member of the loop rotation of the screw effects a positive movement of the clip thereby enabling the side of the cup or like article to be firmly and securely clamped between the gripping elements of the clip and handle. By loosening the screw 5 so as to release the cup from the gripping action of the clip and handle the latter may be easily and quickly removed from the cup or placed in position. When the handle is in position as illustrated it is made secure by tightening the screw so as to cause a side of the cup to be clamped between the gripping elements of the clip and handle. It should be understood that if preferred a suitable packing such as rubber may be interposed between the cup and the gripping elements of the clip and handle and this packing may be attached to the gripping parts of the clip and handle in any preferred way.

The foregoing description and accompanying drawings have reference to what might be considered to be the approved or preferred form of my invention. I desire it to be understood that I may make such changes in construction, combination and arrangement of parts, materials, dimensions, et cetera, as may prove expedient and fall within the scope of the appended claims.

Having thus fully described my invention what I claim as new and desire to secure by Letters Patent, is:—

1. A handle attachment for cups and analogous receptacles comprising a handle provided at one end with a loop of approximately U-shape, a clip of substantially U-form adapted to receive the upper edge portion of the cup or receptacle, and having one member extending into the space between the members of the U-shaped loop of the handle, and a screw engaging the outer member of the clip and passing through one member of the U-shaped loop of the handle and engaging the other member of said loop.

2. A handle attachment comprising a clip of substantially U-form having one member reinforced and provided with a threaded opening, a handle having an end portion bent into substantially U-form and receiving the reinforced member of the clip and a screw passing through one member of the said loop and engaging the threaded member of the clip and having its extremity bearing against the other member of the said loop.

In testimony whereof I affix my signature in presence of two witnesses.

ARTHUR PARRY.

Witnesses:
   Geo. E. Miller,
   Richard G. Cook.